United States Patent [19]

Bruensicke

[11] Patent Number: 4,552,325
[45] Date of Patent: Nov. 12, 1985

[54] EMERGENCY SMOKE DISPOSAL SYSTEM FOR PRESSURIZED AIRCRAFT

[75] Inventor: Wilhelm A. Bruensicke, Santa Monica, Calif.

[73] Assignee: Lockheed Corporation, Burbank, Calif.

[21] Appl. No.: 422,934

[22] Filed: Sep. 24, 1982

[51] Int. Cl.⁴ .................... B64D 13/00; B64D 25/00
[52] U.S. Cl. ............................ 244/118.5; 244/129.2; 15/313; 52/1; 98/19
[58] Field of Search .................... 244/53 B, 121, 119, 244/118.5, 129.1, 129.2, 129.4; 98/1.5, 2, 43, 33, 119, 19; 15/313; 52/1; 89/1 B; 169/61, 16, 62, 11, 45, 91; 137/68 A

[56] References Cited

U.S. PATENT DOCUMENTS

| | | | |
|---|---|---|---|
| 1,146,751 | 7/1915 | Davis | 98/19 |
| 2,085,658 | 6/1937 | Hoffbauer | 169/16 |
| 2,299,668 | 10/1942 | Webster | 15/313 |
| 2,306,420 | 12/1942 | Allen | 172/36 |
| 2,373,916 | 4/1945 | Replogle | 15/313 |
| 2,399,326 | 4/1946 | Crot | 98/1.5 |
| 2,408,774 | 10/1946 | Goddard et al. | 137/68 A |
| 2,641,985 | 6/1953 | Jensen | 98/1.5 |
| 2,641,986 | 6/1953 | Arthur | 98/1.5 |
| 2,661,804 | 12/1953 | Haessler | 169/11 |
| 2,694,537 | 11/1954 | Reichert | 244/118.5 |
| 2,811,090 | 10/1957 | Davis et al. | 98/1.5 |
| 3,069,993 | 12/1962 | Allgood et al. | 98/119 |
| 3,195,439 | 7/1965 | Stratton | 98/2 |
| 3,393,884 | 7/1968 | Zumbiel | 244/129 |
| 3,410,191 | 11/1968 | Jackson | 98/1.5 |
| 3,418,914 | 12/1968 | Finkin | 98/2 |
| 3,428,022 | 2/1969 | Ledley | 116/137 |
| 3,461,789 | 8/1969 | Texidor | 98/1.5 |
| 3,486,410 | 12/1969 | Drexelius et al. | 89/1 B |
| 3,486,562 | 12/1969 | Goodloe et al. | 169/11 |
| 3,511,161 | 5/1970 | Schindelman | 98/1.5 |
| 3,567,162 | 3/1971 | Lea | 244/121 |
| 3,826,180 | 7/1974 | Hayashi | 98/43 |
| 3,955,323 | 5/1976 | Harmathy | 52/1 |
| 3,964,390 | 6/1976 | Medlock | 89/1 B |
| 3,983,892 | 10/1976 | Hardesty | 89/1 B |
| 4,049,221 | 9/1977 | Fountain | 244/118 |
| 4,057,205 | 11/1977 | Vensel | 244/118 |
| 4,068,568 | 1/1978 | Moss | 98/33 |
| 4,121,790 | 10/1978 | Graham | 244/118 |
| 4,194,521 | 3/1980 | Banta | 137/67 |

OTHER PUBLICATIONS

Edward L. Lopez, "Smoke Emission from Burning Cabin Materials and the Effect on Visibility in Wide-Bodied Jet Transports, Mar. 1974, p. 13.

*Primary Examiner*—Galen L. Barefoot
*Attorney, Agent, or Firm*—Louis L. Dachs

[57] ABSTRACT

The present invention provides a convenient and reliable means to evacuate smoke from an interior cabin (30) of a pressurized aircraft (20) by providing a normally closed smoke evacuation outlet (102) in the skin (108) of the aircraft in fluid communication with a relatively large area smoke disposal chute (114) extending upwardly from the cabin's ceiling (50), whereby upon the activation of the outlet, the smoke (106) (that otherwise would rise to and collect below the ceiling of the cabin until the whole cabin is full of smoke) will be discharged into the external airstream, with the differential pressure between the relatively high pressure in the cabin and the relatively low pressure in the external atmosphere (particularly at the high cruising altitudes associated with the operation of modern transport aircraft) providing the actual motive power. Preferably, the outlet is designed to be opened automatically (110, 124) in response to smoke in the vicinity of the smoke disposal chute being detected by means of a conventional type of smoke detector (120). The chute between the ceiling and the outlet on the skin may also be provided with a manual means (132, 134) for blocking the further outflow of pressurized air through the skin outlet opening in the event that the apparatus has been activated inadvertently or in the event that the emergency is over.

9 Claims, 11 Drawing Figures

EMERGENCY SMOKE DISPOSAL SYSTEM FOR PRESSURIZED AIRCRAFT

TECHNICAL FIELD

The present invention relates generally to aircraft fire suppression apparatus and more particularly to apparatus for evacuating smoke from the interior of a pressurized aircraft during an in-flight fire emergency.

BACKGROUND OF THE INVENTION

As is well known, the smoke produced in a fire emergency can pose the greatest hazard to human life, since the occupants adjacent the area wherein the combustion is occurring will be unable to locate emergency exits or otherwise escape to safety, nor (in the event that escape is not feasible) will they even be able to locate and use any available fire suppression equipment such as portable fire extinguishers, blankets and the like. Particularly in a moving enclosed space such as the interior of a large passenger transport aircraft, the smoke will also result in an apparent loss of equilibrium, and will inevitably heighten the panic environment that would be expected under such conditions. Furthermore, the smoke is frequently accompanied by noxious fumes which may further impair visual acuity by irritating the delicate tissues of the human eye as well as impairing respiratory functions.

Cabin materials utilized in the construction of wide-bodied jet transport aircraft are normally tested for smoke emission values in accordance with U.S. National Bureau of Standards procedures utilizing a smoke chamber for providing a numerical measure of a particular material's propensity for impairment of visibility within the aircraft cabin as a result of the emission of smoke when the material is combusted. The combustion of certain types of such materials may also produce irritating gases which further impair human visual acuity. A report dated March 1974 entitled "Smoke Emission From Burning Cabin Materials And The Effect On Visibility In Wide-Bodied Jet Transports," Report No. FAA-RD-73-127 authored by Edward L. Lopez and prepared by the Lockheed-California Company Division of Lockheed Corporation under contract with the Department of Transportation, Federal Aviation Administration, Contract. No. DOT FA 72 NA-665, and published by the National Technical Information Service, Springfield, Va., lists smoke emission values for various types of aircraft cabin materials and details particular tests of human visual acuity during the combustion of materials having particularly high and low smoke emission values in a full-size mock-up of a section of a wide-bodied cabin.

As reported on page 13 of said Report, under the heading "Visibility Tests with Ventilation," the peak smoke densities and the smoke stratification effects during the combustion of smoke-emitting materials were somewhat reduced as a result of the normal air ventilation patterns within the cabin, with the air inlets located in the vicinity of the floor of the cabin and the outlets in the ceiling, but eventually the entire cabin would have severely restricted visibility.

To some extent, the deleterious effects of smoke occurring as a result of a fire aboard the aircraft may be suppressed by means of a mist of water such as is provided by my Stowable Fire Suppression System For Aircraft Cabins And The Like, disclosed and claimed in Co-pending application Ser. No. 335,228 filed on Dec. 28, 1981; however, for maximum effectiveness, the mist needs to be aimed at the source of the smoke. Also of interest is U.S. Pat. No. 4,391,017, "Device for Removing Incendiary Matter from the Interior of an Aircraft," by Applicant. Here, a flexible hose and nozzle are coupled to an outlet in the passenger compartment which is connected to the lower pressure external airstream allowing incendiary material to be "sucked" overboard.

Accordingly, there remains a need for an effective way to evacuate smoke from the interior of a passenger transport aircraft in flight promptly and efficiently so as to prevent any loss of visual acuity or equilibrium that otherwise would occur in the aircraft's occupants, thereby facilitating a proper response to the emergency and in any event reducing the panic conditions that could otherwise be expected to occur under such circumstances.

DISCLOSURE OF THE INVENTION

The present invention provides a convenient and reliable means to evacuate smoke from an interior cabin of a pressurized aircraft by providing a normally closed smoke evacuation outlet in the skin of the aircraft in fluid communication with a relatively large area smoke disposal chute extending upwardly from the cabin's ceiling, whereby upon the activation of the outlet, the smoke (that otherwise would rise to and collect below the ceiling of the cabin until the whole cabin is full of smoke) will be discharged into the external airstream, with the differential pressure between the relatively high pressure in the cabin and the relatively low pressure in the external atmosphere (particularly at the high cruising altitudes associated with the operation of modern transport aircraft) providing the actual motive power.

Preferably, the outlet is designed to be opened automatically in response to smoke in the vicinity of the smoke disposal chute being detected by means of a conventional type of smoke detector. The chute between the ceiling and the outlet on the skin may also be provided with a manual means for blocking the further outflow of pressurized air through the skin outlet opening in the event that the apparatus has been activated inadvertently or in the event that the emergency is over.

With a typical modern wide-body passenger transport aircraft operating under typical high altitude cruise conditions, a smoke disposal outlet opening having an active area of approximately six sq. inches in the aircraft's outer skin will permit approximately 75 pounds (34 kg) (approximately 1,280 cu. feet (150 m$^3$)) per minute of smoke-laden air to be evacuated without any apparent loss in cabin pressurization.

BEST MODE OF PRACTICING INVENTION

Figure 1:
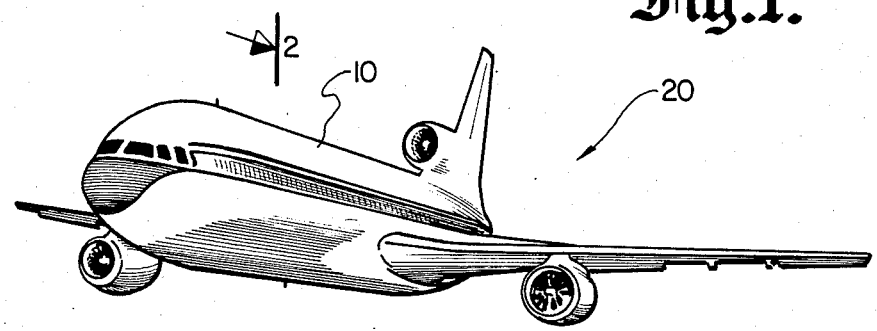
FIG. 1 shows a typical modern passenger aircraft in flight.
Figure 2:
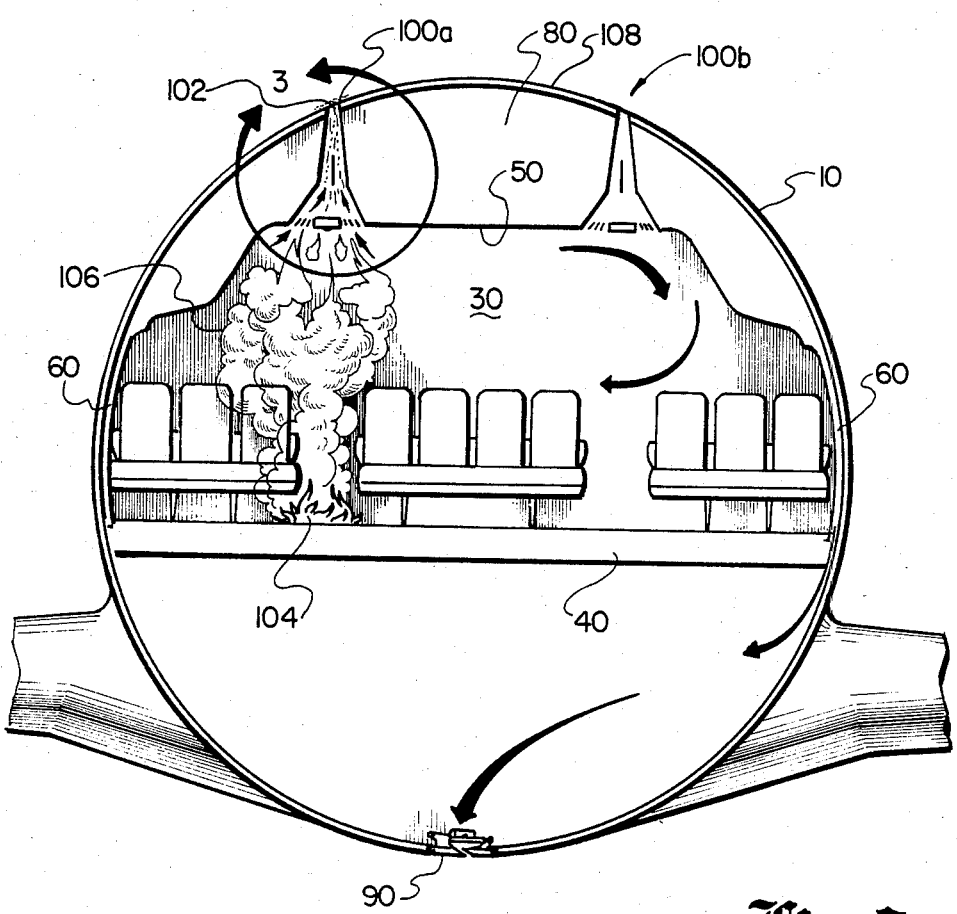
FIG. 2 is a cross section through the aircraft of FIG. 1, showing a typical installation of an emergency smoke disposal apparatus in accordance with the present invention, with smoke from a fire inside the cabin being evacuated by means of said apparatus.

Referring now to FIGS. 1 and 2, it will be seen that the fuselage portion (10) of a typical modern passenger transport aircraft (20) has a generally constant circular cross section of about 20 feet in diameter (6.1 m) with an interior passenger cabin (30) being defined by a load-bearing floor (40), a cabin ceiling (50) and a pair of side walls (60), the latter generally conforming to the semicircular configuration of the fuselage portion (10). Below the floor (40) there is provided a hold area which may include one or more cargo holds as well as various areas for mechanical and electrical equipment. Above the ceiling (50) there is provided a plenum (80), which may contain various duct work, control cables, hydraulic lines and the like, but which nevertheless is for the most part unused space resulting from the fact that the external circular cross section of the fuselage is preferable for withstanding the differential pressure between the interior of the aircraft and the external airstream, while a lower generally horizontal ceiling results in a more aesthetically pleasing interior configuration for the passengers and gives the illusion of more spaciousness.

As is well known, by operating the aircraft at higher altitudes where the atmosphere is much less dense than at sea level, considerable operating efficiencies result. Thus, a typical cruising altitude will be 37,000 feet (11,300 m). On the other hand, the human organism will have difficulty functioning at altitudes much above 10,000 feet (3,050 m), principally as a result of the lack of sufficient oxygen. Accordingly, modern aircraft are pressurized on the inside while in flight to a "cabin altitude" that is normally below 8,000 feet (2,400 m), with the actual pressure profile during the course of the flight being determined by the respective elevations of the departure and arrival air fields as well as the maximum planned cruising altitude.

In addition to maintaining such a differential pressurization between the cabin and the external airstream, the aircraft's environmental control system is also required to control temperature within a normal comfort range and also to introduce fresh air into the cabin. These various functions are conventionally handled by redundant air conditioning packs, each driven by intermediate pressure (45 psig) (3.2 kg/cm$^2$) engine bleed air. Each air conditioning pack thereby has the capability to provide an independent source of pressurized air at a predetermined temperature and flow rate. The conditioned air is mixed in an air distribution manifold and introduced into the various cabin zones through air outlet grilles in the cabin ceiling so as to produce a gentle circulation pattern within the cabin. Air is optionally also introduced through individual air outlets directed at particular seat positions. The cabin air is normally exhausted into the side walls (60) at floor level, whereupon it eventually is discharged overboard through outflow valves (90). The outflow valves (90) are servo controlled during flight so as to maintain a predetermined cabin pressure within a cabin pressurization envelope whose outer boundaries are determined by the maximum permissible differential pressure between the interior of the cabin and the external airstream and also by the maximum permissible cabin altitude. Prior to landing, the pressurization is slowly adjusted so that at some time prior to touchdown the differential pressure will drop to zero; thus there will be no pressure differential tending to lock the emergency exits in their closed positions once touchdown has been achieved.

It will be appreciated that such a system is capable of providing a much higher inflow of conditioned air than is required to maintain the desired cabin pressurization and to compensate for any air leakage which is inherent in the aircraft. In particular, in a typical installation aboard a Lockheed L-1011 aircraft at a cruising altitude of 37,000 feet (11,300 m) and operating in the automatic pressurization mode with only two of the three air conditioning packs in operation, but taking into account the inherent leakage of the aircraft in its "as delivered" condition, the system will deliver an excess of 100 pounds per minute (45 kg/min.) of conditioned pressurized air with the outflow valves fully closed. Under normal equilibrium conditions with the inflow equal to the combined outflow through the outflow valves and through inherent leakage, at a cruising altitude of 37,000 feet (11,300 m) and a cabin altitude of 8,000 feet (2,400 m), the outflow valves will have an activated area of approximately 8 sq. inches (51.6 cm$^2$); with all three packs in operation, the corresponding figures are 226 pounds per minute (103 kg/min.) excess available inflow, which is equivalent to approximately 18 sq. inches (116 cm$^2$) of activated outflow valve area at equilibrium.

Thus, it will be appreciated that a considerable volume of smoke-laden air can be evacuated from the cabin if only an effective discharge flow path were to be provided. The present invention provides such a flow path by means of the smoke evacuation apparatus such as the smoke evacuation units shown in FIG. 2 (100a, 100b) with only the first such unit (100a) being activated. From the above discussion of the mass flow characteristics of the aircraft's pressurization system, it will be appreciated that by limiting the skin opening (102) associated with each individual unit (100) to a maximum of 8 sq. inches (51.6 cm$^2$), 100 pounds per minute (45 kg/min.) of smoke-laden air may be evacuated without any noticeable loss of cabin pressurization. This equates to approximately 1660 cu. feet (47 m$^3$) per minute. By providing a number of such smoke evacuation units (100) and activating only the particular unit (100a) closest to the combustion source (104), it will be appreciated that the smoke (106) from this combustion source will tend to rise and gather at the ceiling level (50) in the vicinity of that particular smoke evacuation unit (100a) and that, accordingly, substantially all of the smoke (106) from the combustion source (104) may be evacuated.

Figure 3:
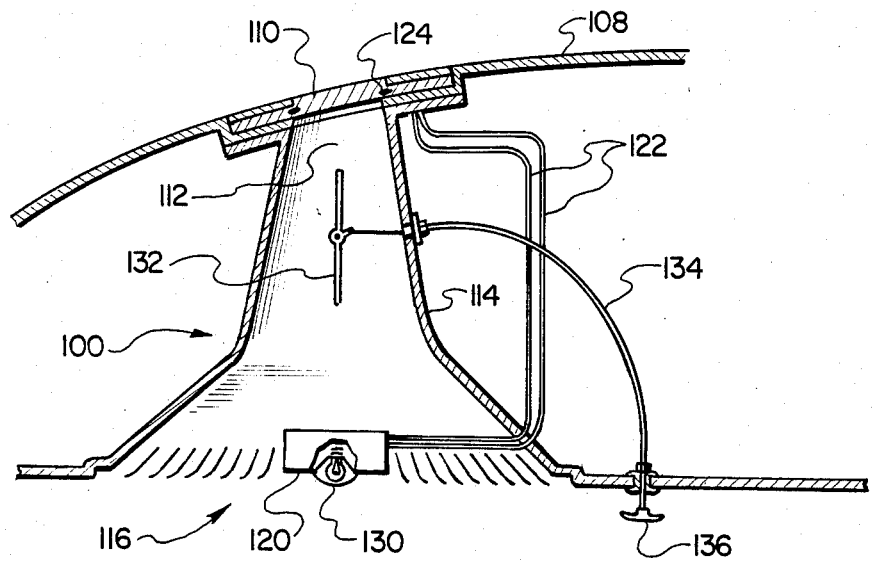
FIG. 3 is an enlarged view of a portion of the smoke evacuation system shown in FIG. 2 with the outlet in the aircraft's outer skin closed.
Figure 4:
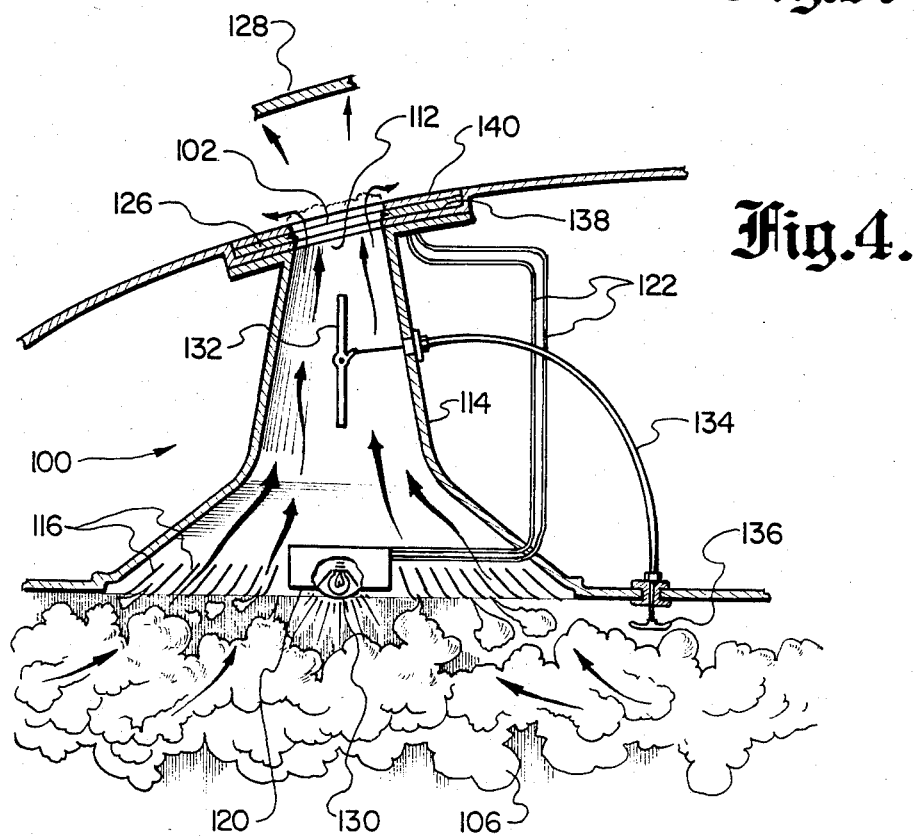
FIG. 4 is a view similar to FIG. 3 but shows the outlet being opened and smoke evacuated therefrom.

Reference should now be made to FIG. 3, which it wil be recalled is an enlarged view of an individual smoke evacuation duct assembly (100). In particular, it will be seen that mounted flush with the external fuselage skin (108) is a breakaway outlet plate (110) that covers the skin outlet opening (100) adjacent the upper end (112) of a smoke evacuation chute (114) that leads downwardly to a grille (116) provided in the ceiling (50). The cross-sectional area of the upper end of the duct (112) is approximately 8 sq. inches (51.6 cm$^2$) in area, but the duct increases in cross-sectional area significantly in the direction of the ceiling grille (116). Thus, once the outlet plate (110) has been broken off and ejected, as shown in FIG. 4, the smoke-laden air (106) will be accelerated gradually as it travels up through the chute (114) until it is ejected through the opening (102). As noted previously, even though the smoke evacuation opening (102) is only approximately 8 sq. inches (51.6 cm$^2$) in area, it may nevertheless accommodate a flow of 1,660 cu. feet per minute (47 m$^3$) with only two air conditioning packs in operation. (This equates to a flow velocity of approximately $1,660 \times 144 \div 8$ feet per minute (47 m$^3 \div 0.00516$ m$^2$ = 9,100 m/min. in the vicinity of the fuselage skin (108).)

As shown in FIGS. 3 and 4, there is preferably provided an automatic smoke detector circuit (120) that is so mounted that it will detect any smoke in the vicinity of the ceiling grille (116), and upon such detection will by means of an appropriate electrical connection (122) activate a pyrotechnic fuse (124) provided about the periphery (126) of the outlet plate (110), thereby permitting the differential pressure to eject an inner breakaway portion (128) and exposing the skin opening (102).

As a further refinement, the smoke detector (120) may be provided with a visible indicating means such as a neon light (130) that will be illuminated only so long as smoke is actually present in the vicinity of the device, and the smoke chute (114) may be provided with a butterfly valve (132) connected to a suitable manual closing means such as a bowden cable (134) terminated with an operating handle (136), whereby upon the cessation of the emergency condition being indicated by means of the extinguishment of the indicator means (130), the chute (114) may be manually closed from the interior of the cabin, thereby interrupting the further flow of air out through the opening (102) and permitting the resumption of normal operation of the aircraft's air conditioning and pressurization system.

Figure 5:
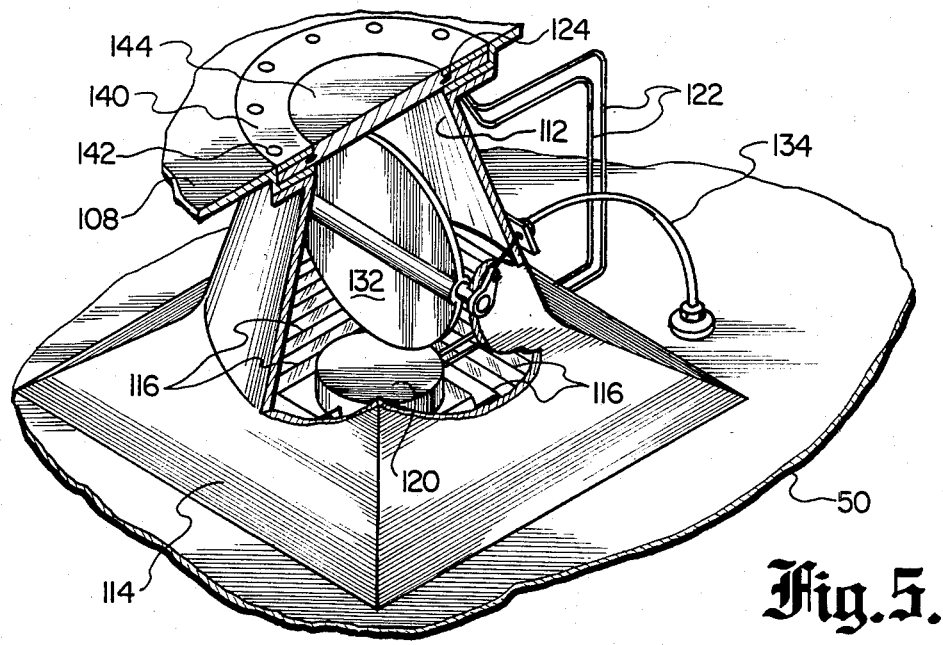
FIG. 5 is an isometric partially cut-away view showing the apparatus of FIG. 3 as it would be seen from outside the aircraft.

FIG. 5 is another view showing the appearance of the outlet cover plate (110) as it would be seen from the exterior of the aircraft. From this figure it may be seen in particular that the outlet plate (110) is mounted flush within a slight depression (138) formed in the skin (108), by means of an annular reinforcing plate (140) and a plurality of suitable fastening means such as recess head machine screws (142).

Figure 6:
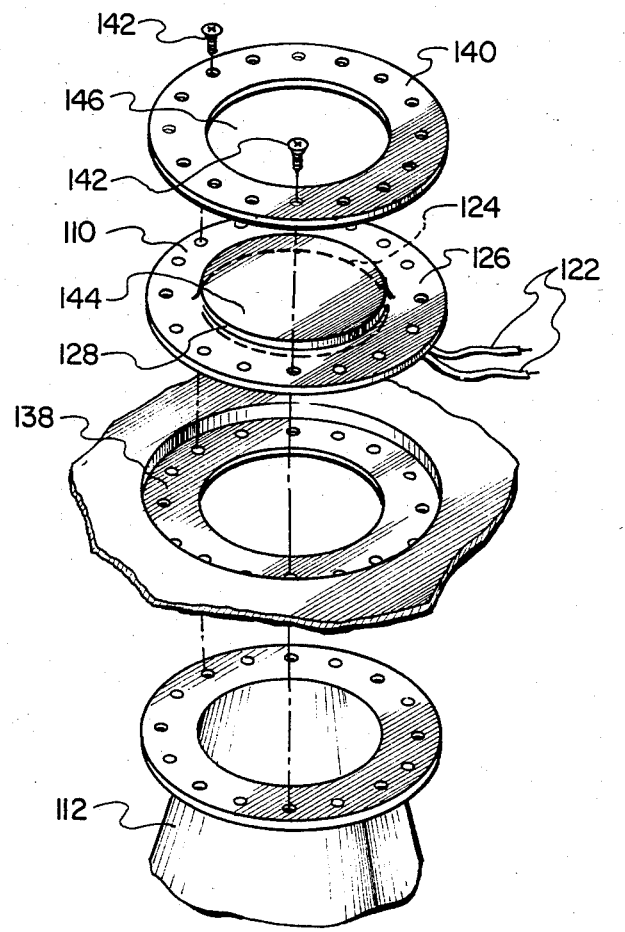
FIG. 6 is an exploded view corresponding generally to FIG. 5 and showing the construction of the smoke outlet.

Referring specifically to FIG. 6, it may be seen that the peripheral portion (126) is somewhat thinner than the raised inner portion (128) of the outlet plate (110), with the outer diameter of the raised portion (128) being slightly smaller than the open interior (146) of the annular retaining plate (140), and with the height of the raised portion (128) relative to the peripheral portion (126) of the plate (110) being approximately equal to the thickness of the retaining plate (140). Furthermore, the depression of the well (138) with respect to the surrounding fuselage skin (108) is approximately equal to the combined thickness of the retaining plate (140) and the peripheral portion (126) of the plate (110). Thus, in their assembled configuration, an essentially smooth uninterrupted surface is provided by the outer fuselage skin (108), the upper surface of the retaining plate (140) and the outer surface (144) of the plate's raised central portion (128).

Still referring to FIG. 6, it will be seen that there is shown in dotted lines the location of the pyrotechnic fuse (124) which is molded about the periphery of the raised inner portion (128) of the plate (110) and which is electrically connected to the wires (122) from the smoke detector (120) such that when an appropriate electrical potential is applied across the pair of wires (122), an annular notch is formed about the periphery of the raised portion (128) which permits it to be separated from the peripheral portion (126) of the cover plate (110), as a result of the differential pressure between the interior of the aircraft and that of the external airstream At maximum cruising altitude (43,000 feet) (13,000 m), this differential pressure will be on the order of 8 pounds per sq. inch (0.56 kg/cm$^2$) and thus for a cover plate (110) providing a smoke evacuation opening (102) having an effective area of about 8 sq. inches (51.6 cm$^2$), the force tending to remove the central portion (128) of the cover plate (110) will be on the order of 64 pounds (29 kg). Thus, it is not necessary that the pyrotechnic fuse (124) completely separate the plate's inner portion (128) from its periphery (126) but only that the connection therebetween be sufficiently weakened that such differential pressure will be effective to result in the ejection of a central portion of the plate, thereby exposing the required outlet opening (102) in the aircraft's outer skin (108) (see also FIG. 4).

Figure 7:
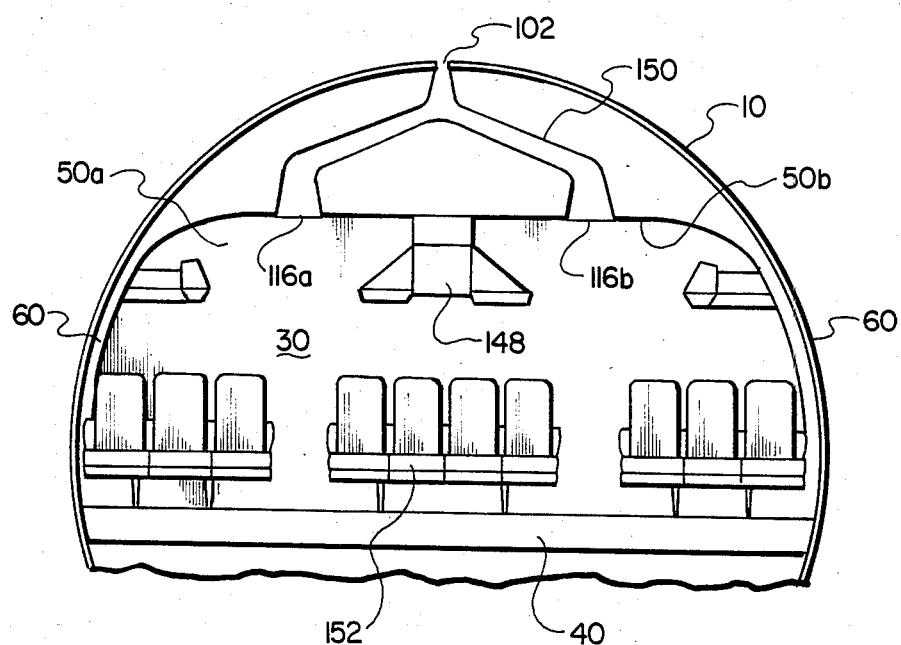
FIGS. 7 and 8 are cross-sectional views through other types of aircraft showing alternative arrangements of the smoke evacuating apparatus.
Figure 8:
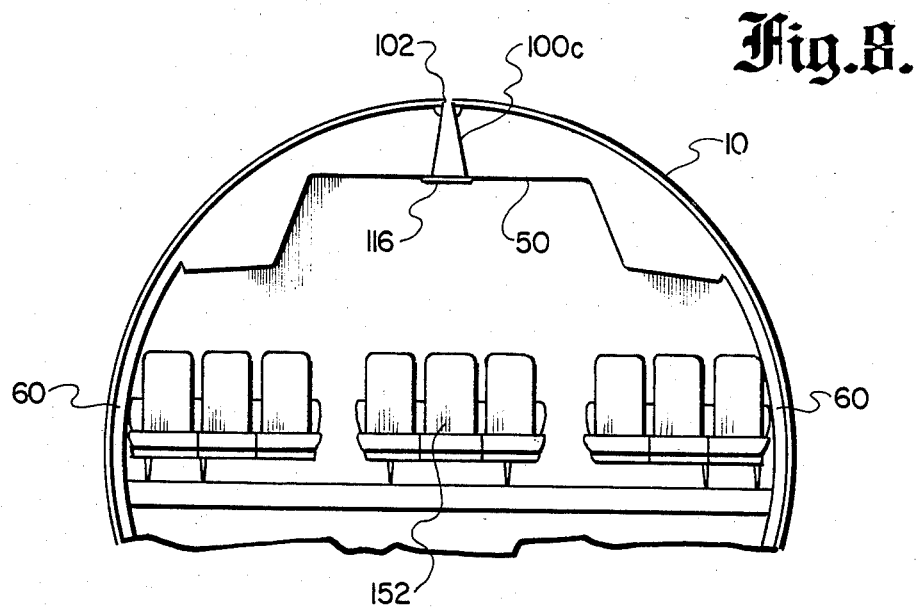

FIGS. 7 and 8 show alternative arrangements to that shown in FIG. 2. In particular, in FIG. 7 it will be seen that the aircraft cabin interior (30) is provided with a central overhead baggage compartment (148) which effectively divides the ceiling area of the cabin into a right-hand portion (50a) and a left-hand portion (50b) with which are respectively associated a pair of ceiling outlet grilles (116a, 116b) branching from a common skin outlet opening (102) by means of a Y-shaped smoke chute manifold (150).

As a result of this branched or "Y" form of construction, upon the activation of the skin outlet opening (102), air will be vented simultaneously through both outlet grilles (116a, 116b). As a consequence, the flow through each of the two grilles (116a, 116b) would be somewhat less than half that associated with the arrangement of FIG. 2 in which each of the two grilles has its individual associated skin opening. However, such a flow should still be more than adequate to evacuate the smoke-laden air resulting from a fire within the cabin and, particularly, if the fire is in the vicinity of the central seating area (152), it will be appreciated that smoke from the fire will rise to and be trapped in both the right-hand ceiling area (50a) and the left-hand ceiling area (50b) and therefore it may be advantageous to have active smoke outlet grilles in both of the ceiling regions (50a, 50b) simultaneously activated.

FIG. 8 shows an alternative embodiment generally similar to the embodiment shown in FIG. 2. However, in place of the two somewhat smaller outlet smoke evacuation duct assemblies (100a, 100b), there is provided a larger unit (100c) having a central duct. Such an arrangement would be particularly advantageous in a larger aircraft in which a considerable volume of cabin air could be discharged without affecting the proper operation of the automatic cabin pressurization system and thus, rather than a plurality of individual smaller outlet openings of perhaps 6 sq. inches (39 cm$^2$), there were provided a fewer number of larger outlet openings, each of perhaps 12–18 sq. inches (77–116 cm²) in area, thereby ensuring that even if the fire were confined to a relatively remote portion of the cabin, there would be an adequate outflow of smoke-laden air.

Typically, a modern large transport aircraft will be subdivided into several distinct cabins by means of fixed service centers and movable interclass barrier screens. Other interior fixtures, such as overhead coat stowage cabinets and lounge areas, may serve further to divide the aircraft's interior into distinct regions. Accordingly, it is generally preferable to include several independent smoke evacuating systems throughout the length of the aircraft.

Figure 9:
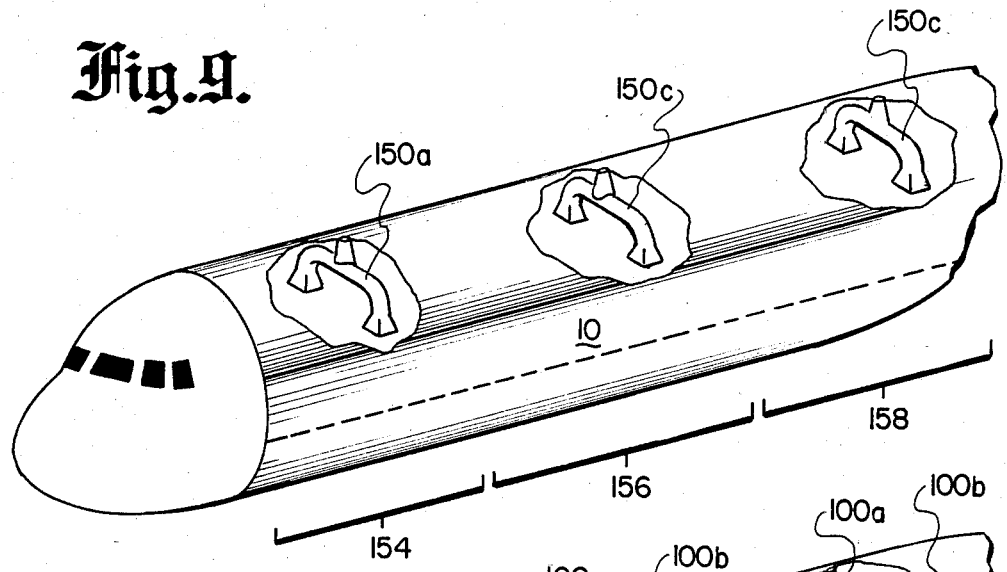
FIGS. 9, 10 and 11 are partially cut-away isometric views of a typical passenger transport aircraft showing different embodiments of the invention installed at various locations within the aircraft's interior.

Referring specifically to FIG. 9, it may be seen that the forward cabin area (154) is provided with a first branched smoke evacuation unit (150a) generally similar to that described previously with respect to FIG. 7. A second such unit (150b) is provided in the center or main cabin area (156), while a third unit (150c) is associated with the aft cabin (158).

Figure 10:
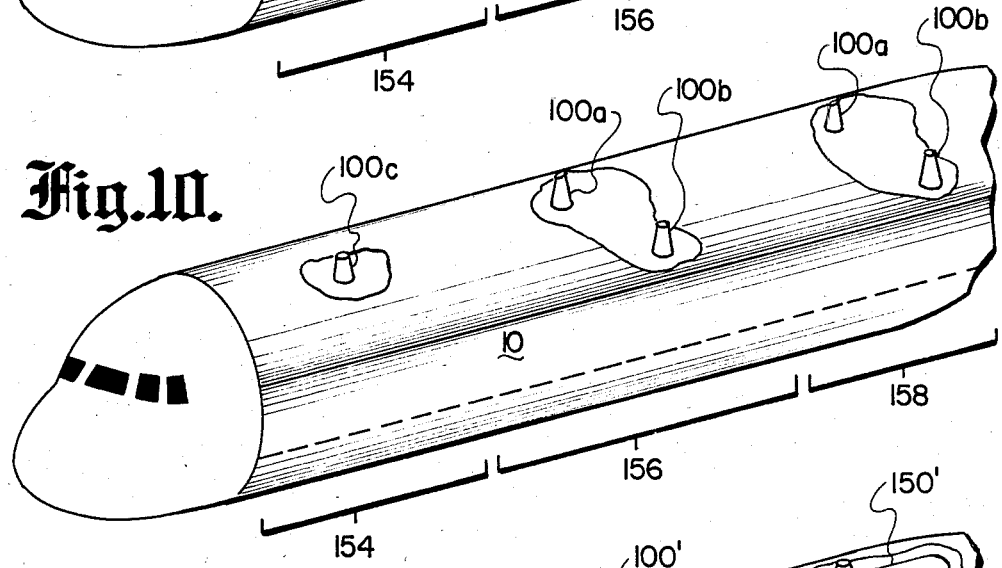

In the embodiment shown in FIG. 10, a single smoke evacuation unit (100c) such as shown in FIG. 8 is associated with the relatively small forward cabin (154), while pairs of such units (100a, 100b) are associated with each of the relatively large center and aft cabins (156, 158), each arranged generally as was shown in the cross-sectional view of FIG. 2.

Figure 11:
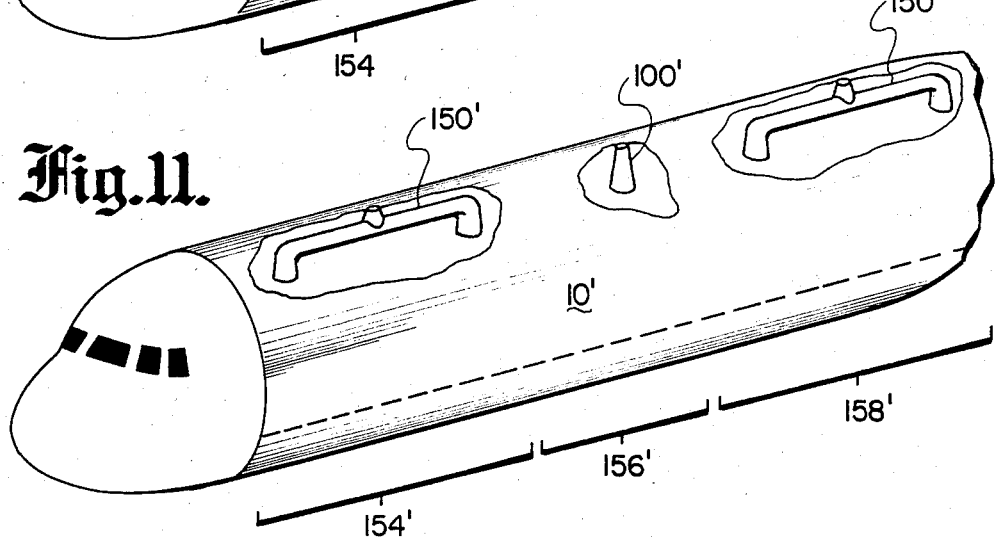

In the embodiment shown in FIG. 11, it will be seen that units utilizing branched chute manifolds (150') generally similar to that shown in the cross-sectional view of FIG. 7 have been included in the forward and rear cabins (154', 158'), while the center or main cabin (156') is provided with a single, somewhat more efficient unit (100'); however, the two branched manifolds (150') are oriented longitudinally rather than laterally (as was shown in FIG. 9). Such an arrangement may be particularly advantageous for aircraft with a standard sized fuselage (10') having a single central aisle.

It is apparent that there has been provided with this invention a novel Emergency Smoke Disposal System for Pressurized Aircraft which fully satisfies the objects, means and advantages set forth hereinbefore. While the invention has been described in combination with specific embodiments thereof, other permutations and combinations of the individual components comprising the invention will be apparent to the skilled artisan in accordance with the practical requirements of a particular installation on a particular type of aircraft. Accordingly, this specification is intended to embrace all such alternatives, modifications and variations as fall within the spirit and broad scope of the appended claims.

I claim:

1. A smoke evacuation system for a vehicle comprising:

a skin opening defined in an outer skin separating an interior compartment within said vehicle from an exterior environment surrounding said vehicle, said interior being capable of being maintained at a positive differential pressure with respect to said exterior;

a cover plate for covering said opening and thereby preventing any flow of air therethrough;

means for ejecting said cover plate from said opening; and a smoke disposal chute having a first end in fluid communication with a region within said compartment at which smoke may be expected to collect and a second end in fluid communication with said opening;

whereby when said cover plate is ejected from said opening, any smoke-laden air in said region will be forced through said opening and evacuated into said external environment as a result of said positive pressure differential.

2. The system of claim 1 further comprising a grille in the vicinity of said first end for preventing the blockage of said chute by foreign objects.

3. The system of claim 1, wherein said vehicle is a transport aircraft provided with an air conditioning pack for conditioning air from said external environment and introducing it under pressure into said interior compartment and with an overflow vent for providing an opening having a variable cross-sectional area in said skin of said aircraft for permitting a portion of said pressurized air to be controllably released to said external environment, and wherein the effective cross-sectional area of said opening after said cover plate has been ejected is less than the effective area of said vent during normal operation of said pack, whereby even after said cover plate has been ejected and said smoke evacuation system opening activated, said air conditioning pack will be able to continue to maintain the conditioned air inside said compartment at a predetermined normal pressure.

4. The system of claim 1 wherein said ejecting means is activated in response to an electrical signal.

5. The system of claim 4 wherein said ejection means comprises an electrically activated pyrotechnic fuse embedded in said cover plate so as to separate a central portion of said cover plate from a peripheral portion upon said electrical signal being applied to said fuse.

6. The system of claim 4 further comprising a smoke detector circuit for generating said electrical signal upon the detection of smoke in said region.

7. The system of claim 1 further comprising means for at least partially blocking said chute after said cover plate has been ejected.

8. The system of claim 1 wherein the effective cross-sectional area of said second end is sufficiently small that said interior compartment will remain pressurized even after said cover plate has been ejected and said opening exposed.

9. The system of claim 8 wherein the effective cross-sectional area of said first end is substantially larger than the cross-sectional area of said second end whereby the velocity of said smoke-laden air will be significantly less in the vicinity of said region compared to that at said opening.

* * * * *